(12) United States Patent
Tsunekawa et al.

(10) Patent No.: US 9,994,312 B2
(45) Date of Patent: Jun. 12, 2018

(54) VERTICAL TAKE-OFF AND LANDING AIRCRAFT

(71) Applicant: IHI CORPORATION, Tokyo (JP)

(72) Inventors: Masayoshi Tsunekawa, Tokyo (JP); Tetsuya Tamura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 631 days.

(21) Appl. No.: 14/886,481

(22) Filed: Oct. 19, 2015

(65) Prior Publication Data

US 2016/0114885 A1  Apr. 28, 2016

Related U.S. Application Data

(63) Continuation of application No. PCT/JP2014/062955, filed on May 15, 2014.

(30) Foreign Application Priority Data

May 16, 2013 (JP) .................................. 2013-103898

(51) Int. Cl.
*B64C 29/00* (2006.01)
*B64C 3/38* (2006.01)
(Continued)

(52) U.S. Cl.
CPC .......... *B64C 29/0033* (2013.01); *B64C 3/385* (2013.01); *B64C 9/24* (2013.01); *B64C 11/001* (2013.01); *B64C 27/006* (2013.01)

(58) Field of Classification Search
CPC .............................. B64C 29/0033; B64C 3/385
See application file for complete search history.

(56) References Cited

U.S. PATENT DOCUMENTS 3,049,320 A * 8/1962 Fletcher .............. B64C 29/0033
244/12.4
3,329,376 A * 7/1967 Sullivan ................ B64C 23/005
244/12.4
(Continued)

FOREIGN PATENT DOCUMENTS

JP  2003-509276 A  3/2003
JP  2008-531395 A  8/2008
(Continued)

OTHER PUBLICATIONS

International Search Report, PCT/JP2014/062955, dated Aug. 12, 2014, 2 pgs.
(Continued)

*Primary Examiner* — Christopher P Ellis
(74) *Attorney, Agent, or Firm* — Volpe and Koenig, P.C.

(57) ABSTRACT

A vertical take-off and landing aircraft includes a propulsion mechanism that generates lift and thrust, a main frame that supports seating and a landing undercarriage, a sub-frame which supports the propulsion mechanism and is arranged so as to be swingable back and forth relative to the main frame, a motive power supply unit supported by the main frame and supplying motive power to the propulsion mechanism, a control stick connected to the sub-frame, and a main wing arranged on the propulsion mechanism, wherein the main wing is formed to be retracted to a position not interfering with an air flow of the propulsion mechanism in a normal time and to be movable to a position where lift is generated when thrust is lost. Gliding is made possible even if thrust is lost while increasing in size of a fuselage is avoided.

10 Claims, 9 Drawing Sheets

(51) Int. Cl.
  *B64C 27/00*  (2006.01)
  *B64C 9/24*  (2006.01)
  *B64C 11/00*  (2006.01)

(56) References Cited

U.S. PATENT DOCUMENTS

| | | | | |
|---|---|---|---|---|
| 3,488,018 | A * | 1/1970 | Johnson | B64C 29/0033 244/12.4 |
| 3,666,209 | A * | 5/1972 | Taylor | B64C 29/0033 244/12.4 |
| 3,966,142 | A * | 6/1976 | Corbett | B64C 1/30 244/12.4 |
| 4,085,911 | A * | 4/1978 | Nahodyl | B64C 1/30 244/12.4 |
| 5,295,643 | A * | 3/1994 | Ebbert | B64C 29/02 244/12.2 |
| 5,758,844 | A * | 6/1998 | Cummings | B64C 29/0033 244/12.4 |
| 6,607,161 | B1 | 8/2003 | Krysinski et al. | |
| 6,691,949 | B2 * | 2/2004 | Plump | B64C 29/02 244/12.2 |
| 6,783,096 | B2 * | 8/2004 | Baldwin | B64C 11/001 244/12.4 |
| 6,863,241 | B2 * | 3/2005 | Sash | B64C 3/385 244/12.4 |
| 7,472,863 | B2 * | 1/2009 | Pak | A63H 27/14 244/12.5 |
| 7,753,309 | B2 * | 7/2010 | Garreau | B64C 29/0033 244/12.4 |
| 8,162,253 | B2 * | 4/2012 | Seiford, Sr. | B60F 5/02 244/7 R |
| 8,256,704 | B2 * | 9/2012 | Lundgren | B64C 29/0033 244/7 C |
| 2006/0196991 | A1 | 9/2006 | Martin | |
| 2007/0158494 | A1 | 7/2007 | Burrage | |
| 2008/0272226 | A1 | 11/2008 | Colclough | |
| 2011/0315806 | A1 | 12/2011 | Piasecki et al. | |
| 2016/0121995 | A1 * | 5/2016 | Bertelsen | B64C 29/0025 244/13 |

FOREIGN PATENT DOCUMENTS

| | | |
|---|---|---|
| JP | 2013-010466 A | 1/2013 |
| JP | 2013-189104 A | 9/2013 |
| WO | 2001/019673 A1 | 3/2001 |
| WO | 03/033344 A2 | 4/2003 |
| WO | 2006/093420 A1 | 9/2006 |

OTHER PUBLICATIONS

Extended European Search Report, European Patent Application No. 14798021.3, dated Dec. 7, 2016, 7 pgs.

* cited by examiner

VERTICAL TAKE-OFF AND LANDING AIRCRAFT

TECHNICAL FIELD

Embodiments described herein relate to a vertical take-off and landing aircraft, and more particularly to a vertical take-off and landing aircraft capable of safe emergency landing when thrust is lost.

BACKGROUND ART

Currently, a typical example of a vertical take-off and landing aircraft capable of generating lift without running on the ground is a helicopter. A helicopter has a large rotor, compared with its fuselage, and generates lift and thrust by rotating the rotor. Also known as one of the few examples is a fixed-wing aircraft that performs vertical take-off and landing by deflecting thrust of a jet engine.

The fuselage of a helicopter is relatively large in itself, and in addition, the helicopter is equipped with a main rotor larger than its fuselage and a tail rotor at the tail of its fuselage. Thus, if take-off, landing or attitude control is performed in a small space surrounded by obstacles such as buildings or trees, the main rotor or the tail rotor may come into contact with the obstacles. Accordingly, a large space is needed for the take-off and landing.

In the case of a fixed-wing aircraft capable of vertical take-off and landing using a jet engine, the jet exhaust is high in temperature and also large in volume. Accordingly, small objects such as stones are blown off by the jet exhaust during take-off or landing, possibly damaging surrounding buildings or the like. Thus, also in the case of the fixed-wing aircraft, a large space is needed for the take-off and landing.

There have already been proposed vertical take-off and landing (VTOL) aircraft capable of safe take-off and landing even in a small space (see Patent Documents 1 and 2, for example). The vertical take-off and landing aircraft described in Patent Documents 1 and 2 are equipped with ducted fans having propeller type fans arranged within cylindrical ducts or nacelles.

RELATED ART DOCUMENT

Patent Document

Patent Document 1: Japanese Patent Laid-Open No. 2006-56364
Patent Document 2: Japanese Patent Laid-Open No. 05-077789

SUMMARY OF THE DISCLOSURE

Problems to be Solved by the Disclosure

However, in the case of the vertical take-off and landing aircraft described in Patent Document 1, since a thrust generating unit is the ducted fans only, there is a problem that the fuselage drops vertically, if the fans stop and thrust is lost. Providing parachutes for emergency can be considered as a solution, but it takes a certain amount of time and a sufficient altitude is needed for opening parachutes. There is also a problem that applying parachutes to the vertical take-off and landing aircraft maneuvered by its crew exposed in the atmosphere is difficult.

Moreover, in the vertical take-off and landing aircraft described in Patent Document 2, the ducted fans are arranged on the fuselage of the aircraft, and a main wing similar to that of an ordinary aircraft is provided, and thus, even if the fans stop and thrust is lost, gliding with the main wing is possible, and emergency landing can be tried. However, since such a vertical take-off and landing aircraft is based on a fuselage of an ordinary aircraft, the size of the fuselage is increased, which requires a certain size of large space for take-off and landing, and there is a problem that merits of the vertical take-off and landing aircraft are reduced.

The present disclosure has been created in view of the aforementioned problems, and an object of the present disclosure is to provide a vertical take-off and landing aircraft which can glide even when thrust is lost while increasing in size of the fuselage is limited.

Means for Solving the Problems

The present disclosure is a vertical take-off and landing aircraft having a propulsion mechanism that generates lift and thrust, a main frame that supports seating and a landing undercarriage, a sub-frame which supports the propulsion mechanism and is arranged so as to be swingable back and forth relative to the main frame, a motive power supply unit supported by the main frame or the sub-frame and supplying motive power to the propulsion mechanism, a control stick connected to the sub-frame, and a main wing arranged on the propulsion mechanism or the sub-frame, wherein the main wing is formed to be retracted to a position not interfering with an air flow of the propulsion mechanism in a normal time and to be movable to a position where lift is generated when thrust is lost.

According to the vertical take-off and landing aircraft of the present disclosure, by arranging the main wing on the propulsion mechanism or the sub-frame, it can be made to swing in conjunction with the propulsion mechanism, can be retracted to the position not interfering with the air flow of the propulsion mechanism in the normal time (during cruise, hovering and the like, for example), and can be moved to the position where lift is generated when thrust is lost.

Effects of the Disclosure

The vertical take-off and landing aircraft according to the present disclosure described above, since lift, which makes the fuselage to glide, can be generated by the main wing using the air flow even if the propulsion mechanism loses thrust due to engine trouble or the like, vertical drop can be avoided. Moreover, since it is only necessary to arrange the main wing on the propulsion mechanism or the sub-frame, increasing in size of the fuselage can be also avoided.

MODE FOR CARRYING OUT THE DISCLOSURE

Figure 1A:
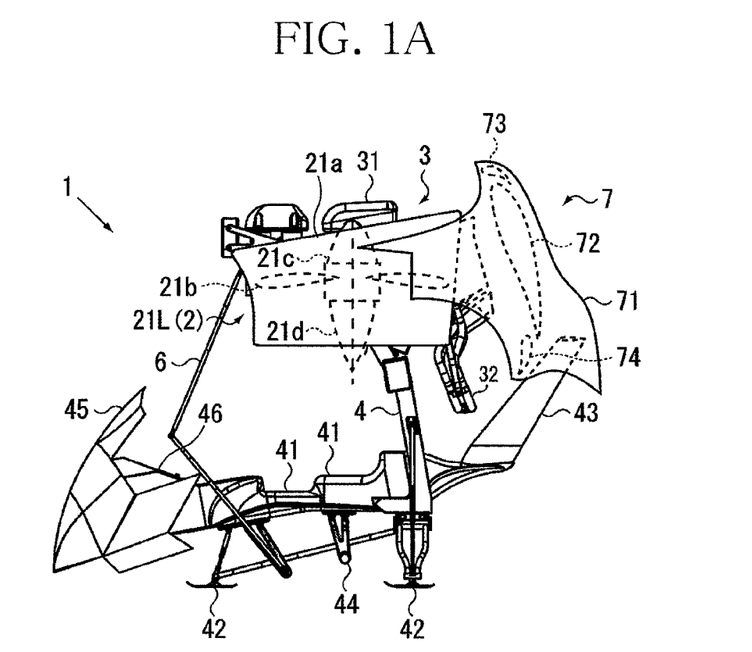
FIG. 1A is a side view showing a vertical take-off and landing aircraft according to a first embodiment of the present disclosure.
Figure 1B:
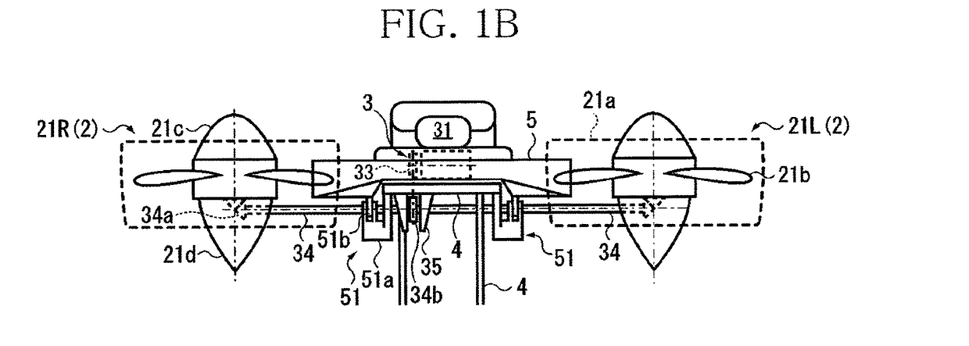
FIG. 1B is a front view showing configuration of a power transmission mechanism of the vertical take-off and landing aircraft according to the first embodiment of the present disclosure.
Figure 1C:
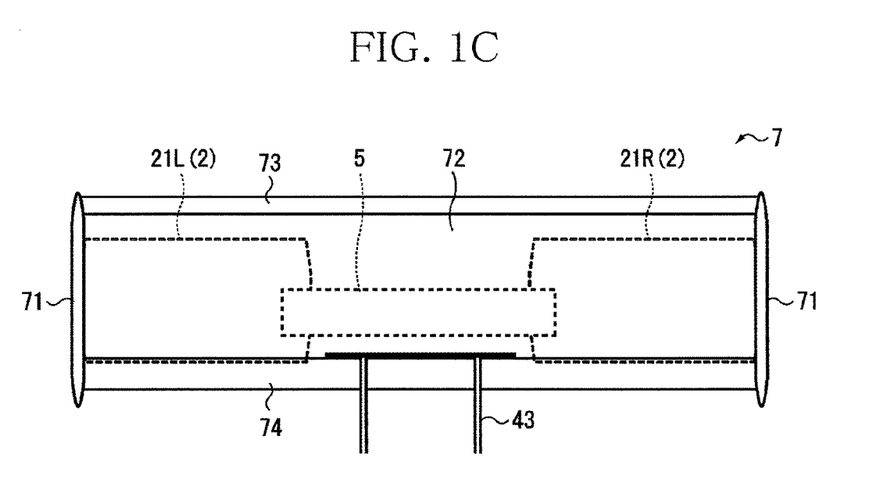
FIG. 1C is a partial back view showing a main wing in the vertical take-off and landing aircraft according to the first embodiment of the present disclosure.

Embodiments of the present disclosure will be described below with reference to FIGS. 1A to 4B. FIGS. 1A to 1C are diagrams showing a vertical take-off and landing aircraft according to a first embodiment of the present disclosure. FIG. 1A is a side view, FIG. 1B is a diagram showing configuration of a power transmission mechanism, and FIG. 1C is a partial back view showing a main wing.

As shown in FIGS. 1A to 1C, a vertical take-off and landing aircraft 1 according to the first embodiment of the present disclosure has a propulsion mechanism 2 that generates lift and thrust, a main frame 4 that supports seating 41 and a landing undercarriage 42, a sub-frame 5 which supports the propulsion mechanism 2 and is arranged so as to be swingable back and forth relative to the main frame 4, a motive power supply unit 3 supported by the main frame 4 or the sub-frame 5 and supplying motive power to the propulsion mechanism 2, a control stick 6 connected to the sub-frame 5, and a main wing 7 arranged on the propulsion mechanism 2. The main wing 7 is formed to be retracted to a position not interfering with an air flow of the propulsion mechanism 2 during a normal time and to be movable to a position where lift is generated when thrust is lost.

The propulsion mechanism 2 includes a ducted fan 21L arranged on the left side (right side in FIG. 1B) of an axis of the main frame 4 and a ducted fan 21R arranged on the right side (left side in FIG. 1B) of the axis of the main frame 4, for example, and these ducted fans 21L, 21R are integrally coupled by the sub-frame 5.

Each of the ducted fans 21L, 21R generally includes a generally cylindrical duct 21a and a propeller 21b rotatably placed in the duct 21a. A nose cone 21c is arranged in the front (upstream side) of a central portion of the propeller 21b. A tail cone 21d is arranged in the rear (downstream side) of the central portion of the propeller 21b. The nose cone 21c has a function to smoothly guide gas sucked by the propeller 21b into the duct 21a. The tail cone 21d has a function to straighten the flow of gas discharged from the duct 21a.

Moreover, though not shown in the drawings, the propeller 21b may have a variable-pitch mechanism. By providing the variable-pitch mechanism, the pitch of the right and left propellers 21b can be changed, and maneuverability can be improved. Furthermore, the propellers may be subjected to feathering in order to reduce air resistance during gliding.

The motive power supply unit 3 is, for example, an engine that supplies motive power to the ducted fans 21L, 21R via the power transmission mechanism shown in FIG. 1B. As a motive power source, instead of the engine, an electric motor, a reciprocating engine, or the like may be used or a supercharger may be installed. The motive power supply unit 3 is fixed to a back face of the main frame 4. The motive power supply unit 3, supplied with fuel from an oil tank 31 arranged at an upper portion of the fuselage, combusts the fuel to output motive power and discharges exhaust gas through an exhaust nozzle 32 arranged in the rear of the motive power supply unit 3.

As shown in FIG. 1B, the power transmission mechanism of the vertical take-off and landing aircraft 1 has the motive power supply unit 3, a sprocket 33 connected to a tip of an output shaft of the motive power supply unit 3, a power transmission shaft 34 having bevel gears 34a at both ends thereof and a sprocket 34b in a middle portion thereof, a roller chain looped around sprockets 33, 34b, and a bearing 35 that rotatably supports the power transmission shaft 34. Power output by the motive power supply unit 3 is transmitted to the power transmission shaft 34 via a chain driving mechanism. Rotation of the power transmission shaft 34 is transmitted to driving shafts of the ducted fans 21L, 21R via the bevel gears 34a.

Power transmission between the motive power supply unit 3 and the power transmission shaft 34 is not limited to the chain driving mechanism but may be a belt driving mechanism or a gear driving mechanism or a driving mechanism with an intervening speed reducer or increaser. Furthermore, when the rotating speeds of the ducted fans 21L, 21R are to be individually controlled, the ducted fans 21L, 21R may connect individually to the motive power supply unit 3. The bearing 35 supporting the power transmission shaft 34 is arranged on the main frame 4 to which the motive power supply unit 3 is fixed, thus preventing a fluctuation in the positional relation between the output shaft of the motive power supply unit 3 and the power transmission shaft 34.

The main frame 4 is a member forming the framework of the fuselage and is a component that supports the propulsion mechanism 2, the motive power supply unit 3, the seating 41, the landing undercarriage 42, and the like. The main frame 4 may have a frame structure in order to reduce the weight of the fuselage. The following are arranged below the main frame 4: the seating 41 on which the crew sits (for example, front seating and rear seating), a plurality of landing undercarriages 42 configuring leg sections that come into contact with the ground or the like at the time of landing, a tail wing 43 that stabilizes moment and balance of the fuselage, a foot rest 44 that supports the crew's feet, and the like. A seat belt may be arranged at the seating 41, and a damper may be placed in the landing undercarriage 42.

Furthermore, a cowl 45 serving as a flow straightener is connected to the front of the seating 41. A part of the cowl 45 is formed of a transparent member in order to ensure visibility, and a back mirror may be arranged on a side portion of the cowl 45. Furthermore, a junction 46 between the seating 41 and the cowl 45 may be used as a console box or as a control section in which operating switches or levers for the motive power supply unit 3 are arranged.

Furthermore, the main body of the motive power supply unit 3 is fixed to the back face of the main frame 4. The oil tank 31 is fixed to an upper portion (ceiling portion) of the main frame 4. Additionally, a plate member configuring a roof section as a rain cover may be arranged at the ceiling portion of the main frame 4.

The sub-frame 5 is a component that connects the left and right ducted fans 21L, 21R together. Furthermore, the control stick 6 extending in front of the seating 41 connects to the sub-frame 5. The control stick 6 extends from the sub-frame 5 to the front of the seating 41. The control stick 6 is swung back and forth to swing the sub-frame 5 back and forth relative to the main frame 4. The control stick 6 is used to swing the sub-frame 5 and the propulsion mechanism 2, and thus may be connected to an outer periphery of the propulsion mechanism 2. As shown in FIG. 1B, the sub-frame 5 is swingably connected to the main frame 4 via a frame coupling section 51.

Such a frame structure is used to fix the seating 41 and the motive power supply unit 3 to the main frame 4, and thus, these components are integrated together so as not to move relative to one another. On the other hand, since the propulsion mechanism 2 (ducted fans 21L, 21R) is fixed to the sub-frame 5, the propulsion mechanism 2 (ducted fans 21L, 21R) can be moved (swung) relative to the seating 41 and the motive power supply unit 3 by swingably connecting the sub-frame 5 to the main frame 4.

The frame coupling section 51 is formed such that the axis of rotation of the power transmission shaft 34 is arranged coaxially with the swing shaft of the sub-frame 5. Furthermore, the frame coupling section 51 has, for example, a main body portion 51a having a first cylindrical portion connected to a lower surface of the main frame 4 and through which the power transmission shaft 34 can be inserted, a swinging section 51b having a second cylindrical portion connected to the lower surface of the sub-frame 5 and inserted and fitted into the first cylindrical portion, and a bearing (not shown in the drawings) arranged between the first cylindrical portion and the second cylindrical portion.

In such a configuration, with a connection state at the junction (bevel gear 34a) between the power transmission shaft 34 and each of the ducted fans 21L, 21R maintained, the ducted fans 21L, 21R can be swung along the axis of rotation of the power transmission shaft 34 to allow the orientation of the propulsion mechanism 2 to be changed. The frame coupling section 51 need only allow the main frame 4 and the sub-frame 5 to move (swing) relative to each other, and is not limited to the illustrated configuration.

As described above, the sub-frame 5 with the propulsion mechanism 2 is formed so as to be swingable relative to the main frame 4 forming the framework of the fuselage. The control stick 6 is manipulated so as to swing around the axis of the power transmission shaft 34 to allow the propulsion mechanism 2 (ducted fans 21L, 21R) to swing (tilt) back and forth. Thus, the flying direction of the fuselage and the like can be controlled. The aforementioned motive power supply unit 3 may be arranged in the sub-frame 5 rather than in the main frame 4, though this is not shown in the drawings. In this case, the axis of rotation of the power transmission shaft 34 need not be arranged coaxially with the swing shaft of the sub-frame 5. This allows the power transmission mechanism to be simplified.

The main wing 7 includes, as shown in FIGS. 1A and 1C, a pair of support panels 71 and 71 fixed to both sides of the propulsion mechanism 2, a main wing body 72 arranged between the support panels 71 and 71, a slat wing 73 arranged in the front of the main wing body 72, and a flap wing 74 arranged in the rear of the main wing body 72, for example. The slat wing 73 and the flap wing 74 are not indispensable elements to the main wing body 72, and both may be omitted or only one of them may be arranged.

The support panel 71 is constituted by a thin plate material having a streamlined shape, for example, and each of them is fixed to an outer surface of the duct 21a of each of the ducted fans 21L, 21R. The shape of the support panel 71 is not limited to that shown in the drawings but may be any other shapes as long as aerodynamic resistance is considered. Moreover, though not shown in the drawings, the support panel 71 may be fixed to the sub-frame 5.

The main wing body 72 has a wing-shaped section as shown in FIG. 1A, for example, and is arranged so as to extend between the support panels 71 and 71 and fixed as shown in FIG. 1C. The main wing body 72 has a surface area that can generate lift for the vertical take-off and landing aircraft 1 to glide against the gravity corresponding to a fuselage weight and a payload weight (total weight of the crew and a cargo) of the vertical take-off and landing aircraft 1. The surface area of the main wing body 72 is changed as appropriate depending on conditions such as the fuselage weight, a maximum payload weight and the like of the vertical take-off and landing aircraft 1. If the surface area of the main wing body 72 is to be made larger, a transverse width of the main wing body 72 may be made longer and arranged by penetrating the support panel 71.

The slat wing 73 is a kind of a high lift device for increasing lift of the fuselage. The slat wing 73 is arranged such that a certain amount of gap is formed from a front edge of the main wing body 72, for example. By arranging the slat wing 73 as mentioned above, separation of air flow can be delayed by allowing a part of the air flow passing along the lower side of the slat wing 73 to flow on the upper side of the main wing body 72. The slat wing 73 is not limited to a fixed wing but may be constituted capable of being retracted in the main wing body 72 during cruise.

The flap wing 74 is also a kind of high lift device for increasing lift of the fuselage. The flap wing 74 is arranged such that a certain amount of gap is formed from a rear edge of the main wing body 72, for example. The flap wing 74 with the configuration as above is called a slotted flap, and the camber of the main wing body 72 can be made longer and moreover, separation of air flow can be delayed by allowing a part of the air flow passing along the lower side of the main wing body 72 to flow on the upper side of the flap wing 74. The flap wing 74 is not limited to the fixed wing but may be constituted such that the angle can be changed in response to a flying state or may be constituted capable of being retracted in the main wing body 72 during cruise.

Moreover, the main wing 7 is constituted such that the main wing body 72 is arranged in the rear of the propulsion mechanism 2 (ducted fans 21L, 21R) in a state in which the propulsion mechanism 2 (ducted fans 21L, 21R) is oriented vertically upward as shown in FIG. 1A. That is, the main wing body 72 is arranged with its wing cord direction substantially in parallel with rotating axes of the ducted fans 21L, 21R. By means of such a configuration, the main wing 7 does not interfere with the air flow passing through the ducted fans 21L, 21R.

Furthermore, the main wing body 72 is arranged so as to have a certain amount of gap from the propulsion mechanism 2 (ducted fans 21L, 21R). Specifically, the main wing body 72 has a certain amount of gap from the duct 21a of each of the ducted fans 21L, 21R and the motive power supply unit 3 (exhaust nozzle 32 and the like). By forming such a gap, the air flow can be made to flow between the propulsion mechanism 2 (ducted fans 21L, 21R) and the main wing body 72 during gliding, and lift can be generated. This gap is set as appropriate in accordance with the conditions such as the weight of the fuselage, the size of the main wing body 72 and the like.

Figure 2A:
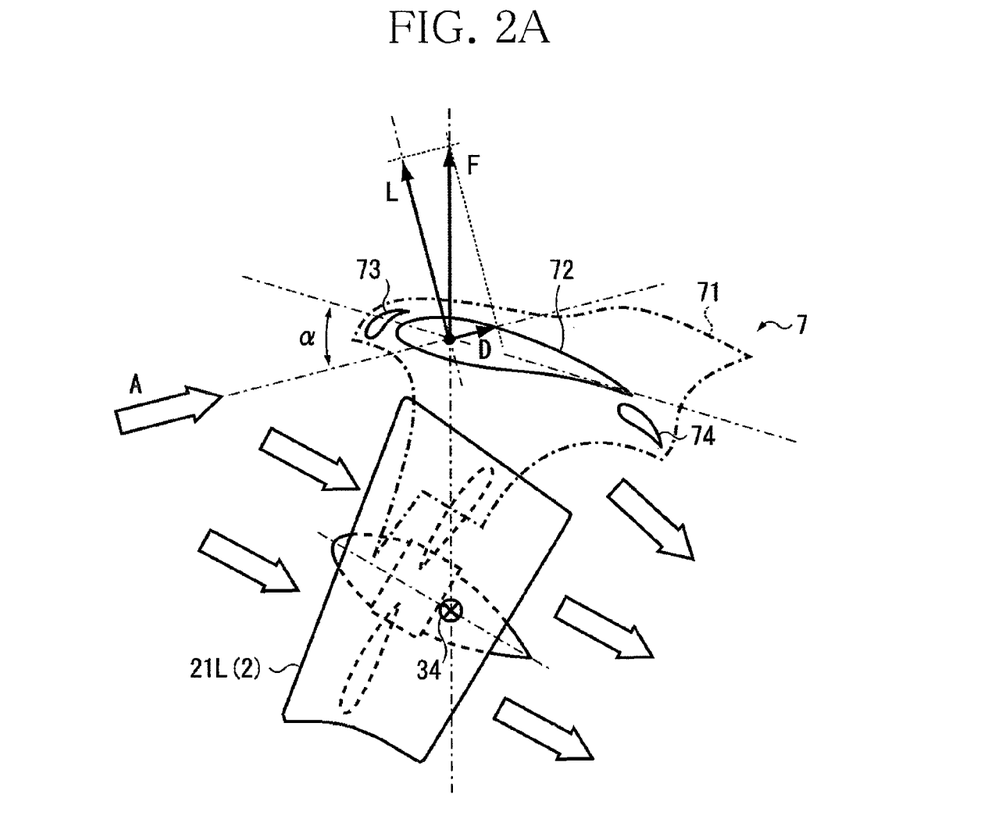
FIG. 2A is a diagram showing an effect during cruise of the vertical take-off and landing aircraft according to the first embodiment.
Figure 2B:
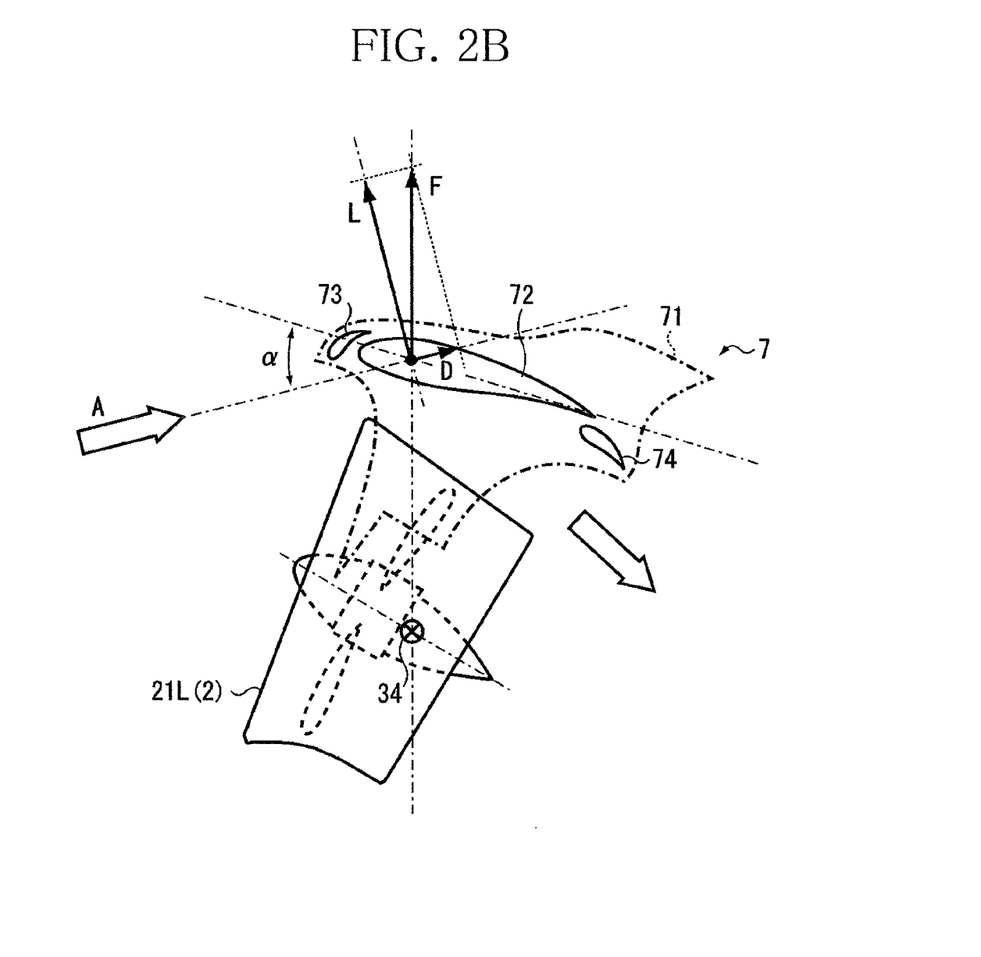
FIG. 2B is a diagram showing a state in which thrust is lost during cruise of the vertical take-off and landing aircraft according to the first embodiment.
Figure 3A:
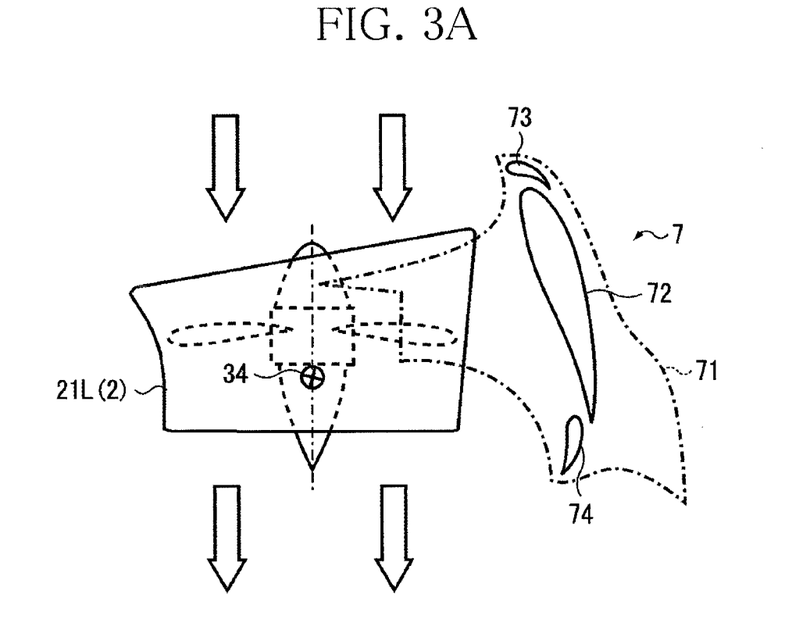
FIG. 3A is a diagram showing an effect during hovering of the vertical take-off and landing aircraft according to the first embodiment.
Figure 3B:
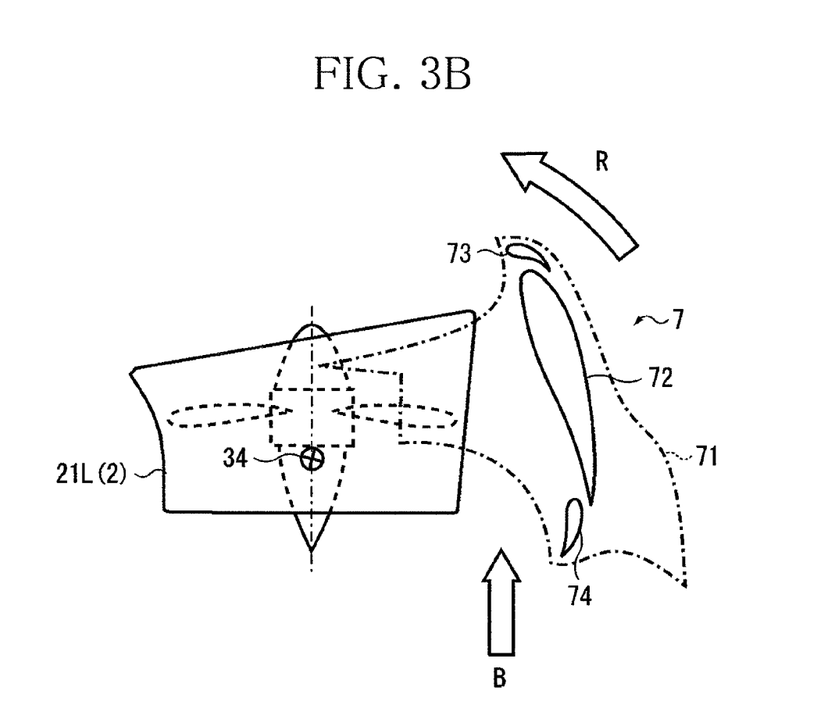
FIG. 3B is a diagram showing a state in which thrust is lost during hovering of the vertical take-off and landing aircraft according to the first embodiment.

Then, an effect of the aforementioned main wing 7 will be described with reference to FIGS. 2A to 3B. FIG. 2A shows an effect during cruise, and FIG. 2B shows an effect in a state in which thrust is lost during cruise. FIG. 3A shows an effect during hovering, and FIG. 3B shows an effect in the state in which thrust is lost during hovering. In the figures, configurations of those other than the ducted fan 21L and the main wing 7 are omitted, and the support panel 71 is shown by a one-dot chain line for convenience of explanation.

As shown in FIG. 2A, during cruise of the vertical take-off and landing aircraft 1, the ducted fan 21L is maneuvered in a state tilted forward with the power transmission shaft 34 as a swing center and generates thrust by sucking air from the front and by ejecting it to the rear. At this time, the main wing 7 is arranged above the ducted fan 21L, and the main wing body 72 has an attack angle α relative to the air flow A generated by thrust of the ducted fan 21L.

In such a cruising state, the air flow A passes through a gap between the main wing body 72 and the ducted fan 21L, and lift L (lift) and drag D (drag) are generated at the main wing body 72. Therefore, the fuselage is lifted upward by a resultant force F thereof, and the main wing 7 assists flight of the vertical take-off and landing aircraft 1.

Then, in the cruising state, if rotation of the ducted fan 21L drastically lowers or stops due to engine trouble or the like, the propulsion mechanism 2 loses thrust. However, in this embodiment, as shown in FIG. 2B, since the main wing 7 which receives the air flow A and generates lift L is provided, while the vertical take-off and landing aircraft 1 is flying by an inertia force, the upward resultant force F can be generated against the gravity of the vertical take-off and landing aircraft 1 by the air flow A passing through the gap between the main wing body 72 and the ducted fan 21L.

Therefore, the vertical take-off and landing aircraft 1 can be made to glide as it is while a vertical drop of the vertical take-off and landing aircraft 1 is avoided. Moreover, by manipulating the control stick 6, the vertical take-off and landing aircraft 1 can safely make an emergency landing at a desired spot. In the vertical take-off and landing aircraft 1 according to this embodiment, the vertical take-off and landing aircraft 1 can be turned by shifting the weight of the crew, and its flying direction can be arbitrarily changed.

As shown in FIG. 3A, during hovering of the vertical take-off and landing aircraft 1, the ducted fan 21L is oriented vertically upward with the power transmission shaft 34 as the swing center and generates thrust by sucking air from above and injecting it downward. At this time, the main wing 7 is arranged in the rear (back side) of the ducted fan 21L and is retracted to a position not interfering with the air flow of the ducted fan 21L.

Then, in the hovering state, if the rotation of the ducted fan 21L drastically lowers or stops due to engine trouble or the like, the propulsion mechanism 2 loses thrust. At this time, the vertical take-off and landing aircraft 1 is to drop vertically, but as shown in FIG. 3B, the air flow B passes through the gap between the main wing body 72 and the ducted fan 21L from the downstream side. As a result, the main wing 7 receives air pressure of the air flow B and generates rotating force R to rotate forward. When the main wing 7 rotates forward, the air flow A passes through the gap between the main wing body 72 and the ducted fan 21L from the upstream side, and finally, the attitude proceeds to the same one as in the state shown in FIG. 2B.

Therefore, also during hovering, similarly to during cruise, the vertical take-off and landing aircraft 1 can be made to glide while the vertical drop of the vertical take-off and landing aircraft 1 is avoided, and by manipulating the control stick 6, the vertical take-off and landing aircraft 1 can safely make an emergency landing at a desired spot.

In the vertical take-off and landing aircraft 1 according to the first embodiment mentioned above, since the main wing 7 is arranged on the propulsion mechanism 2, it can be made to swing in conjunction with the propulsion mechanism 2, can be retracted to the position not interfering with the air flow of the propulsion mechanism 2 in the normal time (during cruise, hovering and the like, for example), and can be moved to the position where lift L is generated when thrust is lost. Therefore, even if the propulsion mechanism 2 loses thrust due to engine trouble or the like, lift L can be generated by the main wing 7 by using the air flow A and the fuselage can be made to glide and thus, the vertical drop can be avoided. Moreover, since it is only necessary that the main wing 7 is arranged on the propulsion mechanism 2, increasing in size of the fuselage can be also avoided.

Figure 4A:
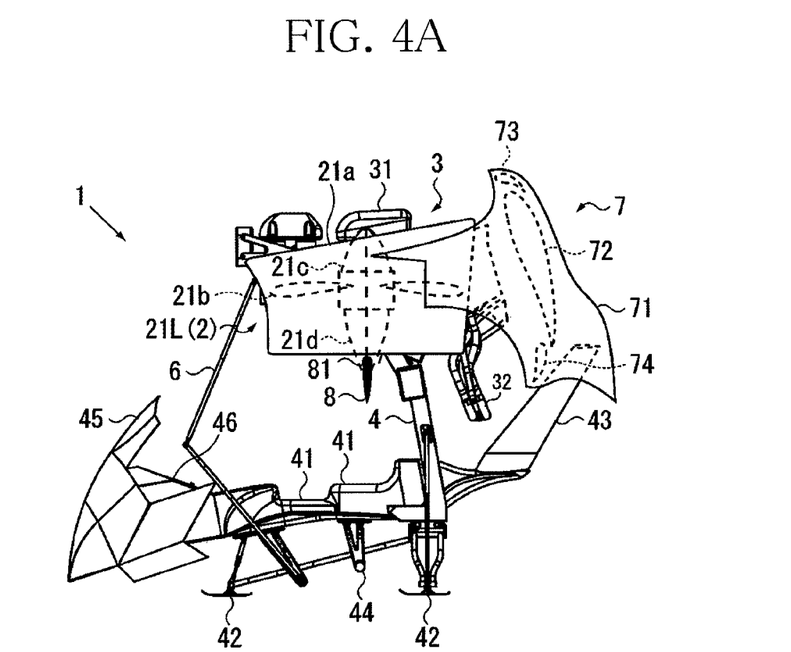
FIG. 4A is a side view showing a vertical take-off and landing aircraft according to a second embodiment of the present disclosure.
Figure 4B:
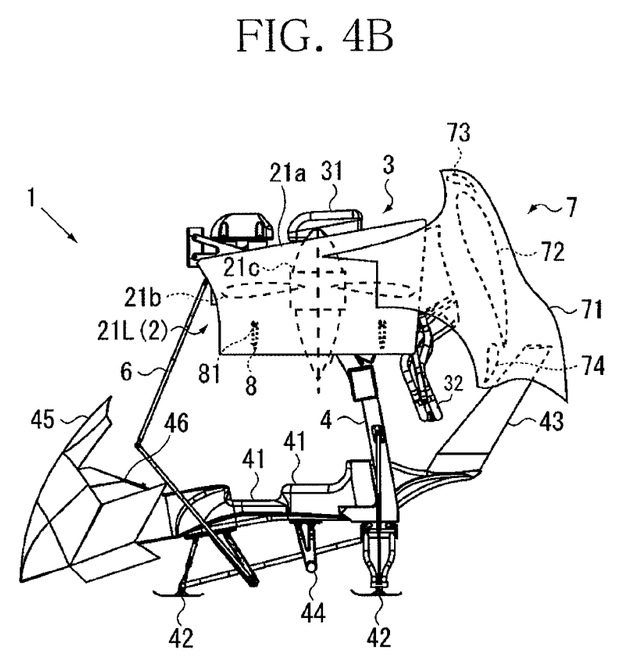
FIG. 4B is a side view showing a vertical take-off and landing aircraft according to a third embodiment of the present disclosure.

Now, vertical take-off and landing aircrafts 1 according to other embodiments of the present disclosure will be described with reference to FIGS. 4A and 4B. FIG. 4A is a side view showing a vertical take-off and landing aircraft according to a second embodiment of the present disclosure. FIG. 4B is a side view showing a vertical take-off and landing aircraft according to a third embodiment of the present disclosure. The same components as those of the vertical take-off and landing aircraft 1 according to the aforementioned first embodiment are denoted by same reference signs and duplicate descriptions are omitted.

The vertical take-off and landing aircraft 1 according to the second embodiment shown in FIG. 4A and the vertical take-off and landing aircraft 1 according to the third embodiment shown in FIG. 4B both have a control vane 8 arranged on the propulsion mechanism 2. That is, the propulsion mechanism 2 is constituted by the ducted fans 21L, 21R and may have the control vane 8 for controlling the direction in which the air passing through the ducted fans 21L, 21R flows.

In the vertical take-off and landing aircraft 1 according to the second embodiment shown in FIG. 4A, the control vane 8 is arranged along horizontal direction of the ducted fans 21L, 21R. Specifically, a swing shaft 81 is extended between the ducts 21a of the ducted fans 21L, 21R and the tail cone 21d, and the control vane 8 is fixed to the swing shaft 81. Though not shown in the drawings, the swing shaft 81 has one end swingably supported by a bearing portion formed on the duct 21a and the other end connected to an actuator placed in the tail cone 21d. Therefore, by rotating the swing shaft 81, the control vane 8 can be made to swing back and forth.

Moreover, though not shown in the drawings, the control vane 8 may be arranged on both right and left sides of the tail cone 21d or may be arranged only on either one of the inner side or the outer side. Moreover, the control vane 8 may be arranged so as to be exposed to the outside of the duct 21a, may be arranged so as to be accommodated inside the duct 21a or may be arranged on the upstream side of the propeller 21b of the ducted fans 21L, 21R.

In the vertical take-off and landing aircraft 1 according to the third embodiment shown in FIG. 4B, the control vane 8 is arranged in the front-back direction of the ducted fans 21L, 21R. Specifically, the swing shaft 81 is extended along the horizontal direction of the duct 21a of the ducted fans 21L, 21R, and the control vane 8 is fixed to the swing shaft 81. Though not shown in the drawings, the swing shaft 81 has one end swingably supported by the bearing portion formed on the duct 21a and the other end connected to the actuator placed in the duct 21a. Therefore, by rotating the swing shaft 81, the control vane 8 can be made to swing back and forth.

Moreover, though not shown in the drawings, the control vane 8 may be arranged on both front and rear sides of the tail cone 21d or may be arranged only on one of the front side or the rear side. Furthermore, the control vane 8 may be arranged so as to be accommodated in the duct 21a, may be arranged so as to be exposed to the outside of the duct 21a or may be arranged on the upstream side of the propeller 21b of the ducted fans 21L, 21R.

By arranging the aforementioned control vane 8 on the propulsion mechanism 2, the air flow passing through the ducted fans 21L, 21R can be controlled by operating the swing of the control vane 8, and thrust can be generated in a desired direction. Therefore, manipulation of the control stick 6 can be assisted by generating force for making the ducted fans 21L, 21R swing relative to the main frame 4 or the vertical take-off and landing aircraft 1 can be turned to the right or left without shifting the weight of the crew.

Moreover, even if thrust is lost, when the air flow is flowing into the ducted fans 21L, 21R by gliding of the vertical take-off and landing aircraft 1, the flying direction of the vertical take-off and landing aircraft 1 can be controlled by controlling the direction of the air flow, and the vertical take-off and landing aircraft 1 can be maneuvered toward a spot suitable for emergency landing.

It is needless to say that the present disclosure is not limited to the aforementioned embodiments but is capable of various changes within a range not departing from the scope of the present disclosure.

A first aspect of the vertical take-off and landing aircraft according to the present disclosure has a propulsion mechanism that generates lift and thrust, a main frame that supports seating and a landing undercarriage, a sub-frame which supports the propulsion mechanism and is arranged so as to be swingable back and forth relative to the main frame, motive power supply unit supported by the main frame or the sub-frame and supplying motive power to the propulsion mechanism, a control stick connected to the sub-frame, and a main wing arranged on the propulsion mechanism or the sub-frame, wherein the main frame is formed to be retracted to a position not interfering with an air flow of the propulsion mechanism in a normal time and to be movable to a position where lift is generated when thrust is lost.

According to the first aspect of the present disclosure, by arranging the main wing on the propulsion mechanism or the sub-frame, it can be made to swing in conjunction with the propulsion mechanism and it can be retracted to the position not interfering with an air flow of the propulsion mechanism during cruise or hovering, for example, and can be moved to the position where lift is generated when thrust is lost.

Therefore, even if the propulsion mechanism loses thrust due to engine trouble or the like, a fuselage can be made to glide by generating lift by the main wing by using the air flow, whereby vertical drop can be avoided. Moreover, since it is only necessary to arrange the main wing on the propulsion mechanism or the sub-frame, increasing in size of the fuselage can be also avoided.

In a second aspect of the present disclosure, the main wing includes a pair of support panels fixed to both sides of the propulsion mechanism and a main wing body arranged between the support panels.

According to the second aspect of the present disclosure, since the both sides of the main wing body are fixed to the pair of support panels, respectively, the main wing body has high structural strength.

In a third aspect of the present disclosure, the main wing is formed such that the main wing body is arranged in the rear of the propulsion mechanism in a state in which the propulsion mechanism is oriented vertically upward.

According to the third embodiment of the present disclosure, interference of the main wing with the air flow passing through the propulsion mechanism can be avoided.

In a fourth aspect of the present disclosure, the main wing body is arranged to have a certain amount of gap from the propulsion mechanism.

According to the fourth embodiment of the present disclosure, since the air flow can be made to flow between the propulsion mechanism and the main wing body during gliding, lift can be generated.

In a fifth aspect of the present disclosure, the main wing is formed to have at least either one of a slat wing arranged in the front of the main wing body and a flap wing arranged in the rear of the main wing body.

According to the fifth aspect of the present disclosure, separation of the air flow from the main wing body can be delayed.

In a sixth aspect of the present disclosure, the propulsion mechanism is constituted by ducted fans and is formed to have a control vane for controlling the flow direction of the air flow passing through the ducted fans.

According to the sixth aspect of the present disclosure, the air flow passing through the propulsion mechanism can be controlled by operating the swing of the control vane, and thrust can be generated in a desired direction.

EXPLANATION OF REFERENCE SIGNS 1 vertical take-off and landing aircraft
2 propulsion mechanism
3 motive power supply unit
4 main frame
5 sub-frame
6 control stick
7 main wing
8 control vane
21L, 21R ducted fans
41 seating
42 landing undercarriage
71 support panel
72 main wing body
73 slat wing
74 flap wing

The invention claimed is:

1. A vertical take-off and landing aircraft comprising:
a propulsion mechanism that generates lift and thrust;
a main frame that supports seating and a landing undercarriage;
a sub-frame which supports the propulsion mechanism and is arranged so as to be swingable back and forth relative to the main frame;
a motive power supply unit supported by the main frame or the sub-frame and supplying motive power to the propulsion mechanism;
a control stick connected to the sub-frame; and
a main wing arranged on the propulsion mechanism or the sub-frame,
wherein the main wing is formed to be retracted to a position not interfering with an air flow of the propulsion mechanism in a normal time and to be movable to a position where lift is generated when thrust is lost.

2. The vertical take-off and landing aircraft according to claim 1, wherein the main wing includes a pair of support panels fixed to both sides of the propulsion mechanism and a main wing body arranged between the support panels.

3. The vertical take-off and landing aircraft according to claim 2, wherein the main wing is formed such that the main wing body is arranged in the rear of the propulsion mechanism in a state in which the propulsion mechanism is oriented vertically upward.

4. The vertical take-off and landing aircraft according to claim 2, wherein the main wing body is arranged to have a certain amount of gap from the propulsion mechanism.

5. The vertical take-off and landing aircraft according to claim 2, wherein the main wing has at least either one of a slat wing arranged in the front of the main wing body and a flap wing arranged in the rear of the main wing body.

6. The vertical take-off and landing aircraft according to claim 1, wherein the propulsion mechanism is constituted by ducted fans and has a control vane for controlling a flow direction of an air flow passing through the ducted fans.

7. The vertical take-off and landing aircraft according to claim 2, wherein the propulsion mechanism is constituted by ducted fans and has a control vane for controlling a flow direction of an air flow passing through the ducted fans.

8. The vertical take-off and landing aircraft according to claim 3, wherein the propulsion mechanism is constituted by ducted fans and has a control vane for controlling a flow direction of an air flow passing through the ducted fans.

9. The vertical take-off and landing aircraft according to claim 4, wherein the propulsion mechanism is constituted by ducted fans and has a control vane for controlling a flow direction of an air flow passing through the ducted fans.

10. The vertical take-off and landing aircraft according to claim 5, wherein the propulsion mechanism is constituted by ducted fans and has a control vane for controlling a flow direction of an air flow passing through the ducted fans.

* * * * *